United States Patent
Judd et al.

(10) Patent No.: US 7,623,868 B2
(45) Date of Patent: Nov. 24, 2009

(54) MULTI-BAND WIRELESS ACCESS POINT COMPRISING COEXTENSIVE COVERAGE REGIONS

(75) Inventors: Mano D. Judd, Rockwall, TX (US); Andria Van Der Merwe, Dallas, TX (US); Gregory A. Maca, Rockwall, TX (US)

(73) Assignee: Andrew LLC, Hickory, NC (US)

( * ) Notice: Subject to any disclaimer, the term of this patent is extended or adjusted under 35 U.S.C. 154(b) by 1528 days.

(21) Appl. No.: 10/244,912

(22) Filed: Sep. 16, 2002

(65) Prior Publication Data

US 2004/0052227 A1 Mar. 18, 2004

(51) Int. Cl.
*H04W 40/00* (2006.01)
(52) U.S. Cl. .............. 455/448; 455/562.1; 343/893
(58) Field of Classification Search .......... 455/63.2, 455/63.3, 63.4, 562.1, 41.2, 446, 448; 343/824, 343/700 MS, 893; 370/334, 348
See application file for complete search history.

(56) References Cited

U.S. PATENT DOCUMENTS

| | | | |
|---|---|---|---|
| 2,866,194 A | 12/1958 | Stavis et al. ................. | 343/725 |
| 3,728,733 A | 4/1973 | Robinson .................... | 343/765 |
| 3,731,315 A | 5/1973 | Sheleg ........................ | 343/854 |
| 4,032,922 A | 6/1977 | Provencher ................. | 343/854 |
| 4,124,852 A | 11/1978 | Steudel ....................... | 343/854 |
| 4,162,499 A | 7/1979 | Jones, Jr. et al. ...... | 343/700 MS |
| 4,189,675 A | 2/1980 | Reilly et al. ................ | 325/4 |
| 4,246,585 A | 1/1981 | Mailloux .................... | 343/854 |
| 4,318,104 A | 3/1982 | Enein ................... | 343/100 LE |
| 4,338,605 A | 7/1982 | Mims ................... | 343/100 LE |
| 4,352,202 A | 9/1982 | Carney ....................... | 455/151 |
| 4,360,813 A | 11/1982 | Fitzsimmons .......... | 343/100 R |
| 4,407,001 A | 9/1983 | Schmidt ..................... | 343/840 |
| 4,446,463 A | 5/1984 | Irzinski ...................... | 343/371 |
| 4,566,013 A | 1/1986 | Steinberg et al. ........... | 343/372 |
| 4,570,165 A | 2/1986 | Tsurumaru et al. ......... | 343/726 |
| 4,605,932 A | 8/1986 | Butscher et al. ...... | 343/700 MS |

(Continued)

FOREIGN PATENT DOCUMENTS

EP 0 936 693 A1 2/1998

(Continued)

OTHER PUBLICATIONS

EP Search Report for EP00122143.1 dated Jan. 19, 2001.

(Continued)

*Primary Examiner*—Blane J Jackson
(74) *Attorney, Agent, or Firm*—Wood, Herron & Evans, LLP

(57) ABSTRACT

A multi-band wireless access point includes a first antenna system including at least one antenna and having a first effective range for communicating with subscribers using a first communications protocol and a second antenna system including a plurality of antennas generally co-located with the first antenna system and having a second effective range for communicating with subscribers using a second communications protocol whereby the first and the second effective ranges are effectively coextensive. Moreover, each of the plurality of antennas in the second antenna system has a greater directivity than the at least one antenna in the first antenna system to compensate for a difference in propagation of the second communications protocol relative to the first communications protocol.

44 Claims, 4 Drawing Sheets

U.S. PATENT DOCUMENTS

| | | | |
|---|---|---|---|
| 4,689,631 A | 8/1987 | Gans et al. | 343/781 R |
| 4,825,172 A | 4/1989 | Thompson | 330/124 R |
| 4,843,402 A | 6/1989 | Clement | 343/758 |
| 4,849,763 A | 7/1989 | DuFort | 342/372 |
| 4,879,711 A | 11/1989 | Rosen | 370/50 |
| 4,890,110 A | 12/1989 | Kuwahara | 342/35 |
| 4,973,971 A | 11/1990 | Sinsky et al. | 342/373 |
| 4,983,988 A | 1/1991 | Franke | 343/853 |
| 4,994,813 A | 2/1991 | Shiramatsu et al. | 342/360 |
| 5,014,342 A | 5/1991 | Pudsey | 455/33 |
| 5,019,793 A | 5/1991 | McNab | 333/156 |
| 5,034,752 A | 7/1991 | Pourailly et al. | 342/373 |
| 5,086,302 A | 2/1992 | Miller | 342/373 |
| 5,089,823 A | 2/1992 | Vasile | 342/383 |
| 5,128,687 A | 7/1992 | Fay | 343/754 |
| 5,230,080 A | 7/1993 | Fabre et al. | 455/15 |
| 5,243,354 A | 9/1993 | Stern et al. | 343/700 MS |
| 5,248,980 A | 9/1993 | Raguenet | 342/354 |
| 5,280,297 A | 1/1994 | Profera, Jr. | 343/754 |
| 5,291,211 A | 3/1994 | Tropper | 343/890 |
| 5,305,002 A | 4/1994 | Holodak et al. | 343/788 |
| 5,327,150 A | 7/1994 | Cherrette | 343/771 |
| 5,351,060 A | 9/1994 | Bayne | 343/766 |
| 5,379,455 A | 1/1995 | Koschek | 455/273 |
| 5,444,864 A | 8/1995 | Smith | 455/84 |
| 5,463,401 A | 10/1995 | Iwasaki | 342/359 |
| 5,485,170 A | 1/1996 | McCarrick | 343/895 |
| 5,486,835 A | 1/1996 | Hock | 342/359 |
| 5,512,906 A | 4/1996 | Speciale | 342/375 |
| 5,552,798 A | 9/1996 | Dietrich et al. | 343/893 |
| 5,589,843 A | 12/1996 | Meredith et al. | 343/820 |
| 5,596,329 A | 1/1997 | Searle et al. | 342/374 |
| 5,604,462 A | 2/1997 | Gans et al. | 330/124 R |
| 5,619,210 A | 4/1997 | Dent | 342/352 |
| 5,633,647 A | 5/1997 | Tines | 343/766 |
| 5,633,736 A | 5/1997 | Griffith et al. | 359/17 |
| 5,644,622 A | 7/1997 | Russell et al. | 455/422 |
| 5,646,631 A | 7/1997 | Arntz | 342/373 |
| 5,663,736 A | 9/1997 | Webb et al. | 342/375 |
| 5,710,804 A | 1/1998 | Bhame et al. | 379/58 |
| 5,714,957 A | 2/1998 | Searle et al. | 342/374 |
| 5,726,978 A | 3/1998 | Frodigh et al. | 370/252 |
| 5,751,250 A | 5/1998 | Arntz | 342/373 |
| 5,754,138 A | 5/1998 | Turcotte et al. | 342/373 |
| 5,754,139 A | 5/1998 | Turcotte et al. | 342/373 |
| 5,758,287 A | 5/1998 | Lee et al. | 455/450 |
| 5,767,807 A | 6/1998 | Pritchett | 342/374 |
| 5,770,970 A | 6/1998 | Ikeda et al. | 330/286 |
| 5,774,808 A | 6/1998 | Särkioja et al. | 455/436 |
| 5,854,611 A | 12/1998 | Gans et al. | 342/373 |
| 5,856,804 A | 1/1999 | Turcotte et al. | 342/371 |
| 5,862,459 A | 1/1999 | Charas | 455/114 |
| 5,862,487 A | 1/1999 | Fujii et al. | 455/454 |
| 5,875,396 A | 2/1999 | Stockton et al. | 455/562 |
| 5,901,356 A | 5/1999 | Hudson | 455/451 |
| 5,960,351 A | 9/1999 | Przelomiec | 455/450 |
| 5,983,098 A | 11/1999 | Gerszberg et al. | 455/426 |
| 6,009,124 A * | 12/1999 | Smith et al. | 375/267 |
| 6,021,309 A | 2/2000 | Sherman et al. | 455/12.1 |
| 6,043,790 A | 3/2000 | Derneryd et al. | 343/853 |
| 6,067,053 A | 5/2000 | Runyon et al. | 343/797 |
| 6,115,762 A | 9/2000 | Bell et al. | 710/62 |
| 6,141,335 A | 10/2000 | Kuwahara et al. | 370/342 |
| 6,157,344 A | 12/2000 | Bateman et al. | 343/700 MS |
| 6,160,514 A | 12/2000 | Judd | 343/700 MS |
| 6,198,460 B1 | 3/2001 | Brankovic | 343/879 |
| 6,222,502 B1 | 4/2001 | Falbo et al. | 343/879 |
| 6,222,503 B1 | 4/2001 | Gietema et al. | 343/890 |
| 6,226,521 B1 | 5/2001 | Liu et al. | 455/453 |
| 6,243,427 B1 | 6/2001 | Stockton et al. | 375/308 |
| 6,246,881 B1 | 6/2001 | Parantainen et al. | 455/450 |
| 6,272,348 B1 | 8/2001 | Saario et al. | 455/452 |
| 6,289,202 B1 | 9/2001 | Kikuhci | 455/62 |
| 6,301,478 B1 | 10/2001 | Wallstedt et al. | 455/436 |
| 6,344,833 B1 * | 2/2002 | Lin et al. | 343/846 |
| 6,351,654 B1 | 2/2002 | Huang et al. | 455/562 |
| 6,356,771 B1 | 3/2002 | Dent | 455/562 |
| 6,369,761 B1 * | 4/2002 | Thiam et al. | 343/700 MS |
| 6,389,062 B1 | 5/2002 | Wu | 375/222 |
| 6,448,930 B1 | 9/2002 | Judd | 343/700 MS |
| 6,650,294 B2 * | 11/2003 | Ying et al. | 343/700 MS |
| 6,895,253 B1 * | 5/2005 | Carloni et al. | 455/506 |
| 7,057,566 B2 * | 6/2006 | Theobold | 343/702 |
| 7,170,873 B1 * | 1/2007 | Cisar et al. | 370/334 |
| 7,181,258 B2 * | 2/2007 | Lin et al. | 455/575.7 |
| 2002/0113743 A1 | 8/2002 | Judd et al. | |
| 2003/0036408 A1 * | 2/2003 | Johansson et al. | 455/560 |
| 2003/0114127 A1 * | 6/2003 | Baldwin | 455/245.1 |
| 2003/0228857 A1 * | 12/2003 | Maeki | 455/278.1 |
| 2004/0183726 A1 * | 9/2004 | Theobold | 343/700 MS |
| 2004/0259518 A1 * | 12/2004 | Aktas et al. | 455/323 |
| 2005/0048963 A1 * | 3/2005 | Kubler et al. | 455/423 |

FOREIGN PATENT DOCUMENTS

| | | |
|---|---|---|
| EP | 1 093 182 A1 | 4/2001 |
| GB | 685073 | 12/1952 |
| GB | 2 286 749 A | 8/1995 |
| WO | WO 95/34102 | 12/1995 |
| WO | WO 98/09372 | 3/1998 |
| WO | WO 98/11626 | 3/1998 |
| WO | WO 98/50981 | 11/1998 |
| WO | WO 02/41449 | 5/2002 |

OTHER PUBLICATIONS

"D-Link Air Pro DWL-6000AP 5GHz/2.4GHz Dual Band Wireless Access Point Data Sheet", *D-Link® Building Network for People*, D-Link Systems, Inc. (2002), 2 pages.

*Cisco Aironet 1200 Series Product Literature*, Cisco Systems, Inc. (1992-2002), http://www.cisco.com/warp/public/cc/pd/witc/ao1200ap/index.shtml, downloaded Aug. 15, 2002, pp. 1-2.

Charny, Ben, "Cisco unveils "future-proof" wireless gear", CNETNews.com, Tech News, (Apr. 17, 2002) http://news.com.com/2100-1033-884601.html, downloaded Aug. 15, 2002, pp. 1-3.

"Infrastructure Feature First Things First", *Wireless LANs Work Their Magic*, http://www.networkcomputing.com/1113/1113f2side2. html, (Jul. 10, 2000), downloaded Jun. 5, 2002, pp. 1-8.

Geier, Jim, "Making the Choice:802.11a or 802.11g", *80211 Planet—Tutorials: Making the Choice: 802.11a or 802.1g*, http://www.80211-planet.com/tutorials/print/O,,10724_1009431,00. html, (Apr. 15, 2002), downloaded Jul. 2, 2002, pp. 1-3.

"IEEE Sets Next-generation 802.11 Standard", http://www.internetnews.com/wireless/print.php/924941, (Nov. 16, 2001), downloaded Jul. 2, 2002, pp. 1-2.

\* cited by examiner

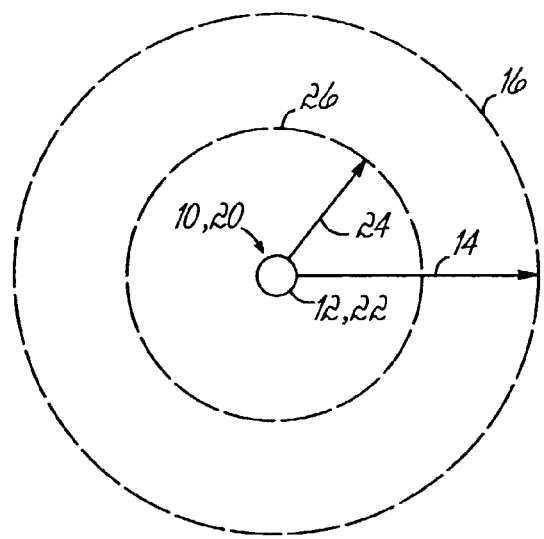
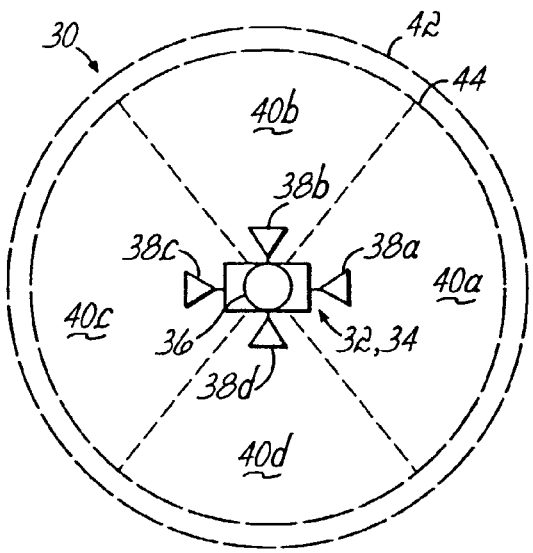
FIG. 1　　　FIG. 2
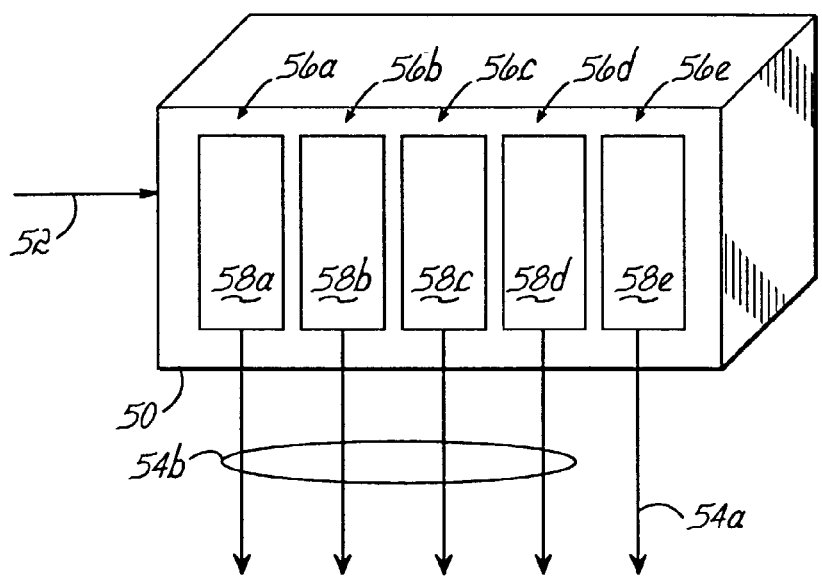
FIG. 3

MULTI-BAND WIRELESS ACCESS POINT COMPRISING COEXTENSIVE COVERAGE REGIONS

FIELD OF THE INVENTION

This invention generally relates to the provision of wireless network services and specifically to the accommodation of multiple communications protocols, each capable of different data service rates.

BACKGROUND OF THE INVENTION

In the provision of communication services within a wireless local area network (WLAN), the area is served by multiple interconnected wireless access points located throughout the area forming the network. Such a network may be installed in airports, shopping malls, office buildings, hospitals, and factories, as well as other locations where wireless accessibility may be desired. A wireless access point typically utilizes an omni-directional antenna that communicates with wireless devices, such as computers containing a network interface card (NICs) configured for WLAN communications. Telephones, paging devices, personal data assistants (PDAs), notebooks, and pocket notebooks, as well as other wireless devices, may also communicate using the network. The layout or configuration of the network, i.e., the spacing or separation of the wireless access points, may be determined by the data rate of communications between the network and the wireless devices, the modulation scheme used in those communications, and/or the propagation of communication signals from the wireless access points.

The Institute of Electrical and Electronics Engineers (IEEE) has promulgated three notable standards or communications protocols for WLANs. The first communications protocol, known as 802.11b, was based on proprietary or 2 Megabit per second (Mbps) products utilizing an unlicensed portion of the spectrum found at approximately 2.4 Gigahertz (GHz). The 802.11b communications protocol specifies a modulation scheme known as complementary code keying (CKK) to encode the wireless data in a format that fits within the bandwidth allotted under Federal Communications Commission (FCC) 802.11 direct-sequence spread-spectrum (DSSS) rules. CKK allows communications at data rates of up to 11 Mbps. Although the majority of WLANs in existence today are consistent with the 802.11b communications protocol, 802.11b WLANs are of limited utility since their speed is approximately that of a 10 Mbps Ethernet link.

Concurrent with the approval of the original 802.11b communications protocol, the IEEE approved the 802.11a communications protocol. The 802.11a communications protocol uses a modulation scheme referred to as orthogonal frequency division multiplexing (OFDM) to achieve a data rate of 54 Mbps through a portion of the spectrum located at approximately 5 GHz. A problem facing wireless network providers is that 802.11b and 802.11a WLANs were never intended to be compatible.

More recently, the 802.11g communications protocol has been promulgated, allowing data rates up to 54 Mbps within the 2.4 GHz band using OFDM.

Faced with the evolution of multiple communications protocols and a demand for increased data rates from subscribers, it may be desirable for a wireless network provider to upgrade an existing network, such as an 802.11b WLAN, to provide support for a newer communications protocol, such as 802.11a and/or 802.11g. Moreover, it may be desirable to support future communications protocols having increased data rates.

A concern in supporting more than one communications protocol is that the typical range of or propagation associated with a wireless access point configured for each of the existing communications protocols tends to be different. Such differences may be attributed to differing data rates, the modulation schemes, the number of channels, and/or the carrier frequencies used. in general, for example, the range of conventional 802.11b wireless access points is greater than that of those supporting the 802.11a or 802.11g protocols.

One approach to managing these differences is to reduce the data rate associated with that communications protocol that has the lesser range or propagation, as range tends to be inversely proportional to data rate. Such an approach thwarts the benefits of increased, or higher, data rates and is undesirable in the face of subscriber demands.

Another approach to managing these differences is to attenuate the radiation associated with that communications protocol that has the greater range or propagation. Such an approach may require more wireless access points, as wireless access points would need to be located closer together. Moreover, where an existing network is laid out based on a higher-range protocol, upgrading that network to a faster protocol may require a substantial re-layout of an existing WLAN, and a commensurate increase in costs. Time consuming additional planning may also be required, further increasing costs.

There is a need for a multi-band wireless access point for use in a wireless network capable of supporting multiple communications protocols with ranges that are effectively coextensive. Moreover, there is a need for a multi-band wireless access point capable of compensating for differences in propagation associated with one or more communications protocols.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

FIG. 1 is a diagram illustrating the potential differences in wireless ranges between two historical wireless access points operating in compliance with the 802.11a and 802.11b communications protocols, each having different data throughputs.

FIG. 2 is a top view of effective ranges of a first embodiment of a multi-band wireless access point configured for operation consistent with principles of the present invention.

FIG. 3 is a front view of an interface for use with the multi-band wireless access point of FIG. 2.

DETAILED DESCRIPTION

Figure 4:
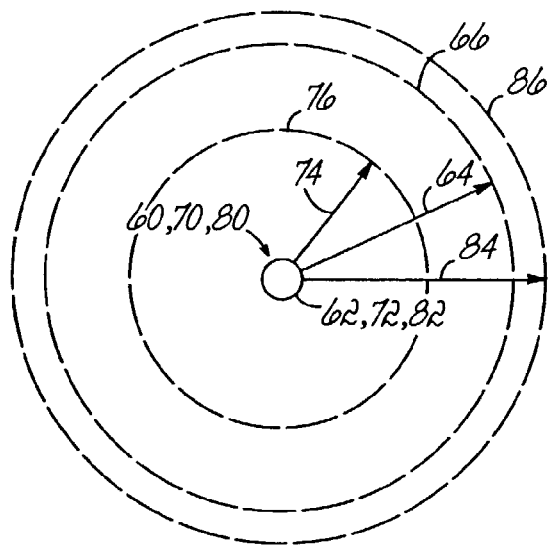
FIG. 4 is a diagram illustrating the potential differences in wireless ranges between three historical wireless access points operating in compliance with the 802.11a, 802.11b, and 802.11g communications protocols, respectively, each having different data throughputs.

The invention addresses the above-noted desires and needs in the art providing a multi-band wireless access point capable of supporting multiple communications protocols with effectively coextensive ranges for each communications protocol. Moreover, such a multi-band wireless access point compensates for differences in propagation associated with each communications protocol without reducing data rates or relying on attenuation or redistributing access points within an existing network. In accordance with principles of the present invention, a multi-band wireless access point capable of supporting higher data rates and/or higher carrier frequencies at increased ranges is provided.

To this end, a multi-band wireless access point may comprise a first antenna system including at least one antenna and having a first effective range for communication with subscribers using a first communication protocol and a second antenna system including a plurality of antennas generally co-located with the first antenna system and having a second effective range for communicating with subscribers using a second communications protocol wherein the first and second effective ranges are effectively coextensive. A multi-band wireless access point may also comprise a first antenna system including at least one antenna for communication with subscribers using a first communication protocol and a second antenna system including a plurality of antennas generally co-located with the first antenna system for communicating with subscribers using a second communications protocol wherein each of the plurality of antennas in the second antenna system has a greater directivity than the at least one antenna in the first antenna system to compensate for a difference in propagation of the second communications protocol relative to the first communications protocol.

Such multi-band wireless access points having such antenna systems allow upgrading of an existing wireless local area network (WLAN) to communications protocols offering higher data rates without the additional time consuming planning associated with layout due to differences in ranges and/or propagation associated with multiple communications protocols. Moreover, such multi-band wireless access points having such antenna systems may be used to provide for a desired number of channels for particular communications protocols.

FIG. 1 is a diagram illustrating potential differences in range and/or propagation between two concentrically located historical wireless access points 10, 20 operating in compliance with the 802.11a and 802.11b communications protocols, respectively, each configured for maximum data throughput capability. Wireless access points 10 and 20 utilize omni-directional antennas 12, 22, respectively, each configured for use in the appropriate frequency band. Wireless access points 10 and 20 are shown concentrically located to facilitate a generalized comparison of their ranges and/or propagation.

For example, wireless access point 10 may be configured for operation using complementary code keying (CKK) to encode wireless data in a format that fits with the bandwidth allotted under Federal Communications Commission (FCC) 802.11 direct-sequence spread-spectrum (DSSS). As such, wireless access point 10 and omni-directional antenna 12 operate at a carrier frequency of 2.4 Gigahertz (GHz), the operation being consistent with FCC 802.11b communications protocol, and allowing wireless devices to communicate at data rates up to 11 Megabits per second (Mbps). Similarly, access point 20 and omni-directional antenna 22 may be configured for operation in accordance with the FCC 802.11a communications protocol, the FCC 802.11a communications protocol specifying a carrier frequency of 5 GHz and capable of supporting data rates up to 54 Mbps.

It has been found that when operating at data throughputs of less than 6 Mbps wireless access points 10 and 20 may have similar ranges and may be able to propagate communications signals to subscribers a similar distance. However, when operating at throughputs of greater than 6 Mbps, wireless access point 10 may be able to propagate communications signals a distance greater than that of wireless access point 20.

As illustrated in FIG. 1, it has been found that when operating at a data rate of 11 Mbps, wireless access point 10 may be able to propagate communications signals a distance of approximately 140 feet, as indicated by arrow 14. Similarly, it has been found that wireless access point 20, operating at a data rate of 54 Mbps, may be able to propagate communications signals a distance of approximately 70 feet, as indicated by arrow 24. Circles 16 and 26 further illustrate such differences in range and/or propagation associated with the communications signals from wireless access points 10 and 20, respectively. Thus, as illustrated in FIG. 1, the range and/or propagation for communication signals consistent with the 802.11b and 802.11a communications protocols may differ significantly, making upgrade of an existing WLAN difficult and/or costly.

Those skilled in the art will appreciate that differences in range and/or propagation associated with the communications signals from wireless access points 10 and 20 are merely exemplary in nature and are shown for purposes of illustration of needs and desires addressed by the present invention. Such differences may not be indicative of actual differences experienced in particular installations of particular wireless access points. Moreover, those skilled in the art will appreciate that such differences between communications protocols may be attributable not only to differing data rates, but also the modulation schemes, the number of channels, and/or the carrier frequencies used.

Referring to FIG. 2, a top view exemplifying the range and/or propagation of a first embodiment 30 of a multi-band wireless access point configured for operation consistent with principles of the present invention is illustrated. Multi-band wireless access point 30 functions such that the ranges 14, 24 shown in FIG. 1 are effectively coextensive as will be described hereinafter.

Multi-band wireless access point 30 comprises a first antenna system 32 including at least one antenna for communicating with subscribers using a first communications protocol and a second antenna system 34 including a plurality of antennas for communicating with subscribers using a second communications protocol. The second antenna system 34 is generally co-located with the first system 32, as illustrated in FIG. 2.

For example, the first antenna system 32 may comprise an omni-directional antenna 36, while the plurality of antennas in the second antenna system 34 may be directional antennas 38a-d, where M is the number of antennas and α is the azimuth of each antenna (e.g., M=4, α=90°), defining regions 40a-d, respectively. In such an arrangement of antennas each of the plurality of antennas 38a-d in the second antenna system 34 has a greater directivity than the at least one antenna 36 in the first antenna system 32 thereby compensating for a difference in propagation of the second communications protocol relative to the first communications protocol.

Consistent with the historical example given in FIG. 1, the first communications protocol in the embodiment 30 of FIG. 2 may be 802.11b and the second communications protocol may be 802.11a. Moreover, the data rate for 802.11b may be 11 Mbps, while the data rate for 802.11a may be 54 Mbps per region 40a-d. In operation, the directivity of each of the plurality of antennas 38a-d is such that the effective range of 802.11a at higher data rates is effectively coextensive with that of 802.11b. Thus, access point 30 may advantageously service four high data rate 802.11a channels and a low data rate 802.11b channel. Circles 42 and 44 exemplify the effectively coextensive ranges for the first and second antenna systems 32, 34, respectively.

Those skilled in the art will appreciate that ranges 42, 44 need not match or be equivalent. However, it is typically desirable for ranges 42, 44 to be effectively coextensive such that the spacing or layout of multi-band wireless access point 30 is not dependent on a particular communication protocol. Moreover, multi-band wireless access point 30 need not rely a particular protocol. Embodiments of the present invention may support any existing or future communications protocol.

For example, in another embodiment of the present invention having an antenna system like that of FIG. 2, the first communications protocol may be 802.11g, while the second communications protocol remains 802.11a. In such an embodiment the range of 802.11a is effectively coextensive with that of 802.11g. Moreover, the channels may be assigned to particular regions 40a-d such that the spatial capacity in the regions 40a-d is increased. In this embodiment, three high data rate 802.11a channels and one high data rate 802.11g channel may be advantageously provided. Such an alternative embodiment may be advantageously deployed in a concentrated area of wireless device users known as a "hotspot". Again, those skilled in the art will appreciate that other existing or future communications protocols may also be utilized.

Referring to FIG. 3, a front view of an interface 50 configured for use with the multi-band wireless access point 30 of FIG. 2 is illustrated. Interface 50 provides an interface between wired network segment 52, such as an Ethernet backbone, and wireless network segments 54a, 54b as will be described hereinafter.

Interface 50 may be advantageously designed and manufactured with multiple internal slots 56a-e for plug-in circuit boards, cards, packs or modules containing circuits 58a-e. As configured, circuits 58a-e allow channel assignments and/or frequency planning for the 802.11b and 802.11a or, alternatively, the 802.11b and 802.11g communications protocols. Such circuits 58a-e capable of assigning channels and/or performing frequency planning are capable of being implemented by one of ordinary skill in the art having the benefit of the present disclosure.

For example, circuits 58a-d couple to the plurality of antennas 38a-d, respectively (shown in FIG. 2), and are configured for operation using the 802.11a communications protocol, as described hereinabove. Similarly, circuit 58e couples to the at least one antenna 32 (also shown in FIG. 2) and is configured for operation using the 802.11b, or alternatively the 802.11g, communications protocol.

Those skilled in the art will appreciate that an interface 50 may include additional slots (not shown) for additional circuits (also not shown) for coupling to differing numbers of antennas for use with combinations of similar or different communications protocols, and performing channel assignments and/or frequency planning as appropriate therefore. An interface 50 may also include empty slots (not shown) for future upgradability. Further, an interface 50 and circuits 58a-e may be combined as unit or module or circuits 58a-e may be combined. Other physical arrangements and/or configurations will readily appear to those skilled in the art.

Referring to FIG. 4, a diagram illustrating potential differences in range and/or propagation between three concentrically located historical wireless access points operating in compliance with the 802.11a, 802.1b, and 802.11g communications protocols, each having different data throughputs is illustrated. Wireless access points 60, 70, and 80 utilize omnidirectional antennas 62, 72, and 82, respectively, each configured for use in the appropriate frequency band. Wireless access points 60, 70, and 80 are shown concentrically located to facilitate a generalized comparison of their ranges and/or propagation.

For example, wireless access point 60 may be configured for operation consistent with the 802.11b communications protocol, and has a data throughput of 6 Mbps per channel. Similarly, wireless access point 70 may be configured for operation in accordance with the 802.11a communications protocol, and has a data throughput of 31 Mbps per channel, whereas wireless access point 80 may be configured for operating in accordance with the 802.11g communications protocol, and has a data throughput of 12 Mbps per channel. Such throughputs depend in part on the physical layer associated with the modulation scheme use for each communications protocol, the physical layer requiring 11 Mbps, 54 Mbps, and 54 Mbps for 802.11b, 802.11a, and 802.11g communications protocols, respectively.

As illustrated in FIG. 4, it has been found that wireless access point 60 may be able to propagate communications signals a distance of approximately 120 feet, as indicated by arrow 64. It has also been found that wireless access point 70 may be able to propagate communications signals a distance of approximately 70 feet and wireless access point 80 may be able to propagate communications signals a distance of approximately 150 feet, as indicated by arrows 74 and 84, respectively. Circles 66, 76 and 86 further exemplify such differences in range and/or propagation associated with the communications signals from wireless access points 60, 70 and 80, respectively. Thus, as illustrated in FIG. 4, the range and/or propagation for communication signals consistent with the 802.11a, 802.11b, and 802.11g communications protocols may differ significantly, making upgrade of an existing WLAN difficult and/or costly.

Figure 5:
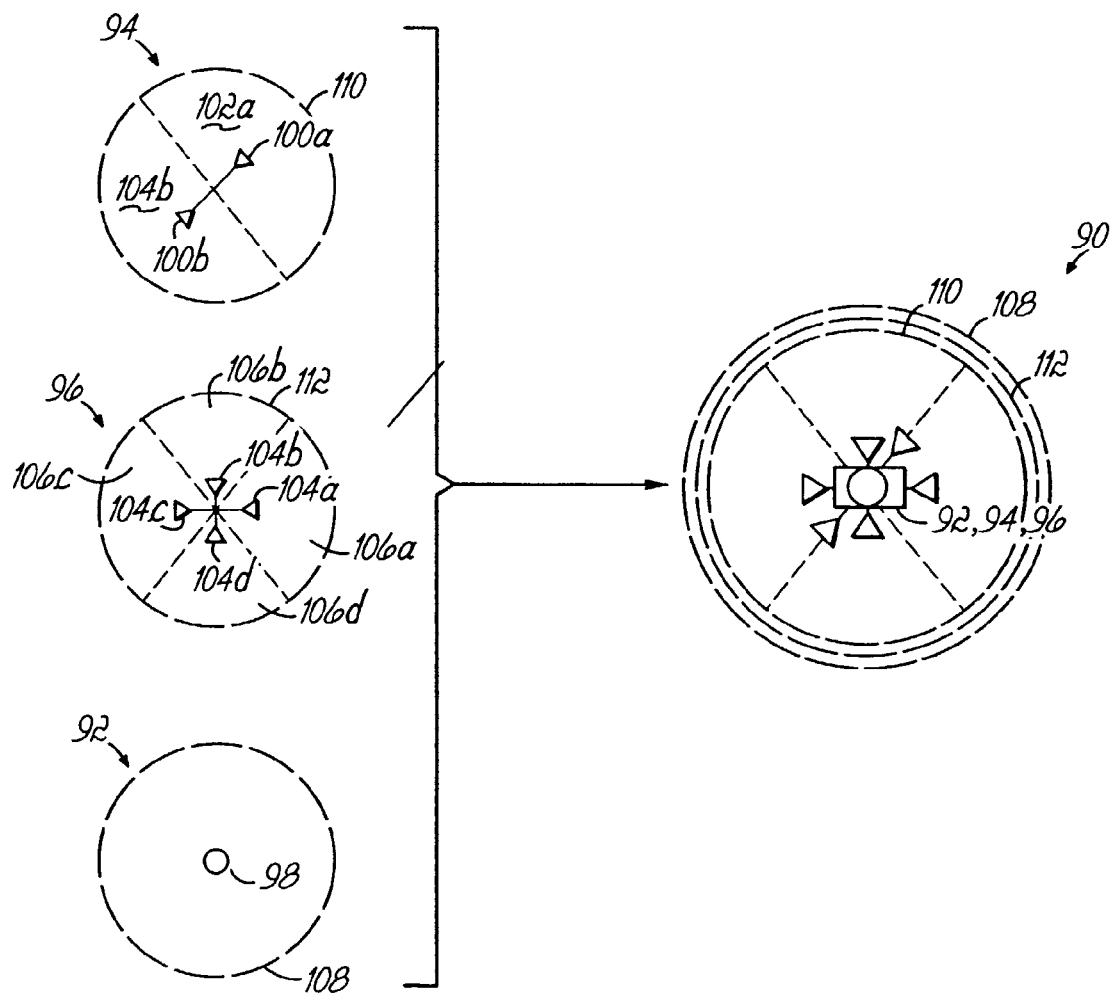
FIG. 5 is a top view of effective ranges of a second embodiment of a multi-band wireless access point configured for operation consistent with principles of the present invention.

Referring to FIG. 5, a top view exemplifying the range and/or propagation of a second embodiment 90 of a multi-band wireless access point configured for operation consistent with principles of the present invention is illustrated. Multi-band wireless access point 90 may function such that the ranges 66, 76 and 86 shown in FIG. 4 are effectively coextensive as will be described hereinafter.

Multi-band wireless access point 90 comprises a first antenna system 92 including at least one antenna for communicating with subscribers using a first communications protocol, a second antenna system 94 including a first plurality of antennas for communicating with subscribers using a second communications protocol, and a third antenna system 96 including a second plurality of antennas for communicating with subscribers using a third communications protocol. The second and third antenna systems 94, 96 are generally co-located with the first antenna system 92, as illustrated in FIG. 5.

For purposes of explanation, the aforementioned antenna systems 92, 94, 96 associated with the three communications protocols have been broken-out, or apart, on the left side of FIG. 5; however, the right side of FIG. 5 shows the antenna systems 92, 94, 96 generally co-located.

For example, the first antenna system 92 may comprise an omni-directional antenna 98, while the first plurality of antennas in the second antenna system 94 may be directional antennas 100a, 100b, where M is the number of antennas and $\alpha$ is the azimuth of each antenna (e.g., M=2, $\alpha$=180°), defining regions 102a, 102b, respectively, and the second plurality of antennas in the third antenna system 96 may be directional antennas 104a-d, where N is the number of antennas and $\beta$ is the azimuth of each antenna (e.g., N=4, $\beta$=90°), defining regions 106a-d, respectively.

Consistent with the historical example given in FIG. 4, the first, second and third communications protocols in FIG. 5 may be 802.11g, 802.11b, and 802.11a, respectively. In operation, the directivity of each of the antennas in each of the pluralities of directional antennas 94a, 94b and 96a-d is such that the effective range of 802.11b and 802.11a is effectively coextensive with each other and that of 802.11g. Thus, multi-band wireless access point 90 may advantageously service three high data rate 802.11a channels and a high data rate 802.11b channel, thereby increasing spatial capacity. The effectively coextensive ranges for the first, second and third antenna systems 92, 94, 96 are exemplified by circles 108, 110 and 112, respectively.

Again, those skilled in the art will appreciate that ranges 108, 110, and 112 need not match or be equivalent. Rather ranges 108, 110, and 112 need only be effectively coextensive such that the spacing or layout of multi-band wireless access point 90 is not dependent on a particular communications protocol. Moreover, multi-band wireless access point 90 need not rely on any particular communications protocol.

In upgrading an existing WLAN, such as an 802.11b WLAN, and providing support for one or more communications protocols offering increased data rates, such as 802.11a and/or 802.11g, additional features may be desirable. These features may, in part, stem from the desirability of maintaining existing wireless access point spacing in a WLAN associated with a particular protocol, such as 802.11b, when upgrading to a higher data rate communications protocol, such as 802.11a and/or 802.11g. Such additional features flow naturally and logically from the embodiments described hereinabove and further define principles of the present invention. Thus, the embodiments of FIGS. 6, 7, and 8 further illustrate some such features.

Figure 6:
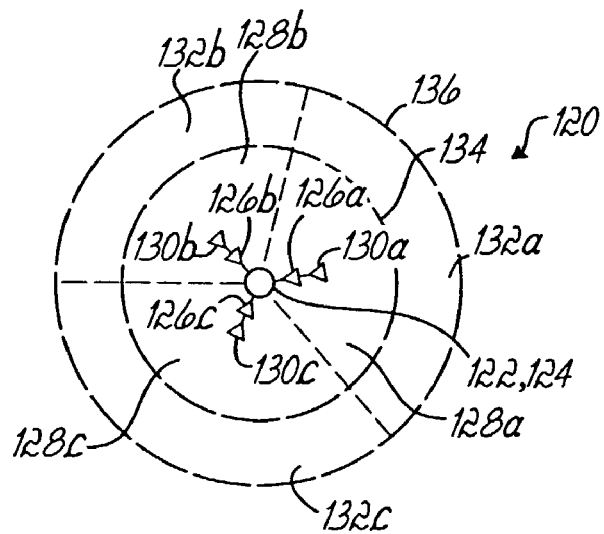
FIG. 6 is a top view of effective ranges of a third embodiment of a multi-band wireless access point configured for operation in accordance with principles of the present invention.

Referring to FIG. 6, a top view exemplifying the range and/or propagation of a third embodiment 120 of a multi-band wireless access point configured for operation consistent with principles of the present invention is illustrated. Multi-band wireless access point 120 comprises a first antenna system 122 including a first plurality of antennas for communicating with subscribers using a first communications protocol and a second antenna system 124 including a second plurality of antennas for communicating with subscribers using a second communications protocol. The second antenna system 124 is generally co-located with the first antenna system 122, as illustrated.

For example, the first plurality of antennas in the first antenna system 122 may be directional antennas 126a-c, where M is the number of antennas and $\alpha$ is the azimuth of each antenna (e.g., M=3, $\alpha$=120°), defining regions 128a-c, respectively, and the second plurality of antennas in the second antenna system 124 may be directional antennas 130a-c, where N is the number of antennas and $\beta$ is the azimuth of each antenna (e.g., N=3, $\beta$=120°), defining regions 132a-c, respectively. Moreover, the first communications protocol may be 802.11a and the second communications protocol may be 802.11g. Thus, access point 120 has an equal number of high data rate channels for 802.11a and 802.11g. The directivity of each of the antennas in the first and second pluralities of antennas 126a-c, 130a-c provide sufficient additional collective is such that the effective range of 802.11a at higher data rates is effectively coextensive with that of 802.11g while maintaining an existing wireless access point spacing typically associated with 802.11b. Circles 134 and 136 exemplify the effectively coextensive ranges for the first and second antenna systems 122, 124, respectively.

In operation, multi-band wireless access point 120 may provide sustained high data throughput despite an increased number of subscribers per access point in a WLAN. Typical venues of installation for such a multiband wireless access point 120 may be hotspot areas with higher subscriber density, where high data rates and/or many subscribers need to be accommodated. Such areas may include airports, shopping malls, coffee shops, etc.

Figure 7:
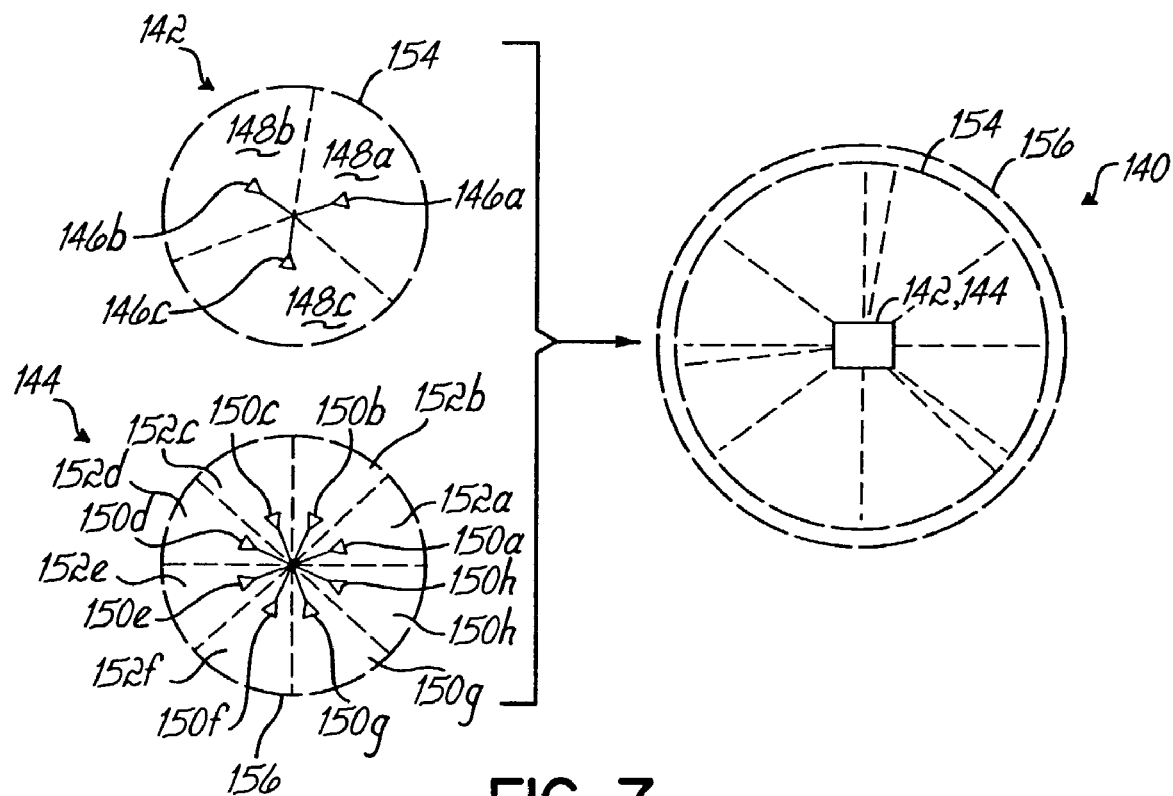
FIG. 7 is a top view of effective ranges of a fourth embodiment of a multi-band wireless access point having multiple sectors and configured for operation consistent with principles of the present invention.

Referring to FIG. 7, a top view exemplifying the range and/or propagation of a fourth embodiment of a multi-band wireless access point 140 configured for operation consistent with principles of the present invention is illustrated. Multi-band wireless access point 140 comprises a first antenna system 142 including a first plurality of antennas for communicating with subscribers using a first communications protocol and a second antenna system 144 including a second plurality of antennas for communicating with subscribers using a second communications protocol. The second antenna system 144 is generally co-located with the first antenna system 142.

Similar to FIG. 5 and for purposes of explanation, the aforementioned antennas associated with the two communications protocols have been broken-out, or apart, on the left side of FIG. 7; however, the right side of FIG. 7 shows the first and second antenna systems 142, 144 generally co-located.

For example, the first plurality of antennas in the first antenna system 142 may be directional antennas 146a-c, where M is the number of antennas and $\alpha$ is the azimuth of each antenna (e.g., M=3, $\alpha$=120°), defining regions 148a-c, respectively, and the second plurality of antennas in the second antenna system 144 may be directional antennas 150a-h, where N is the number of antennas and $\beta$ is the azimuth of each antenna (e.g., N=8, $\beta$=45°), defining regions 152a-h, respectively. Moreover, the first communications protocol may be 802.11b and the second communications protocol may be 802.11a.

Thus, access point 140 provides eight (N=8) high data rate 802.11a channels and three (M=3) low data rate 802.11b channels. The directivity of each of the antennas in the second plurality of antennas 150a-h is such that the effective range of 802.11a at higher data rates is effectively coextensive with that of the first plurality of antennas 146a-c associated with the 802.11b communications protocol while maintaining an existing wireless access point spacing typically associated with 802.11b. The effectively coextensive ranges for the first and second antenna systems 142, 144 are indicated at circles 154, 156, respectively. Typical venues of installation for such a multi-band wireless access point 140 may also be airports, shopping malls, coffee shops, etc.

Although typical historical access points (e.g., see FIGS. 1 and 4) employ omni-directional antennas and the embodiments of the present invention described hereinabove may also be configured to provide 360° coverage, the present invention is not limited to providing 360° coverage. For example, in areas like hallways or corridors, 360° coverage does not yield optimal use of transmitted energy from a wireless access point since walls and other structures absorb much of the transmitted energy.

Figure 8:
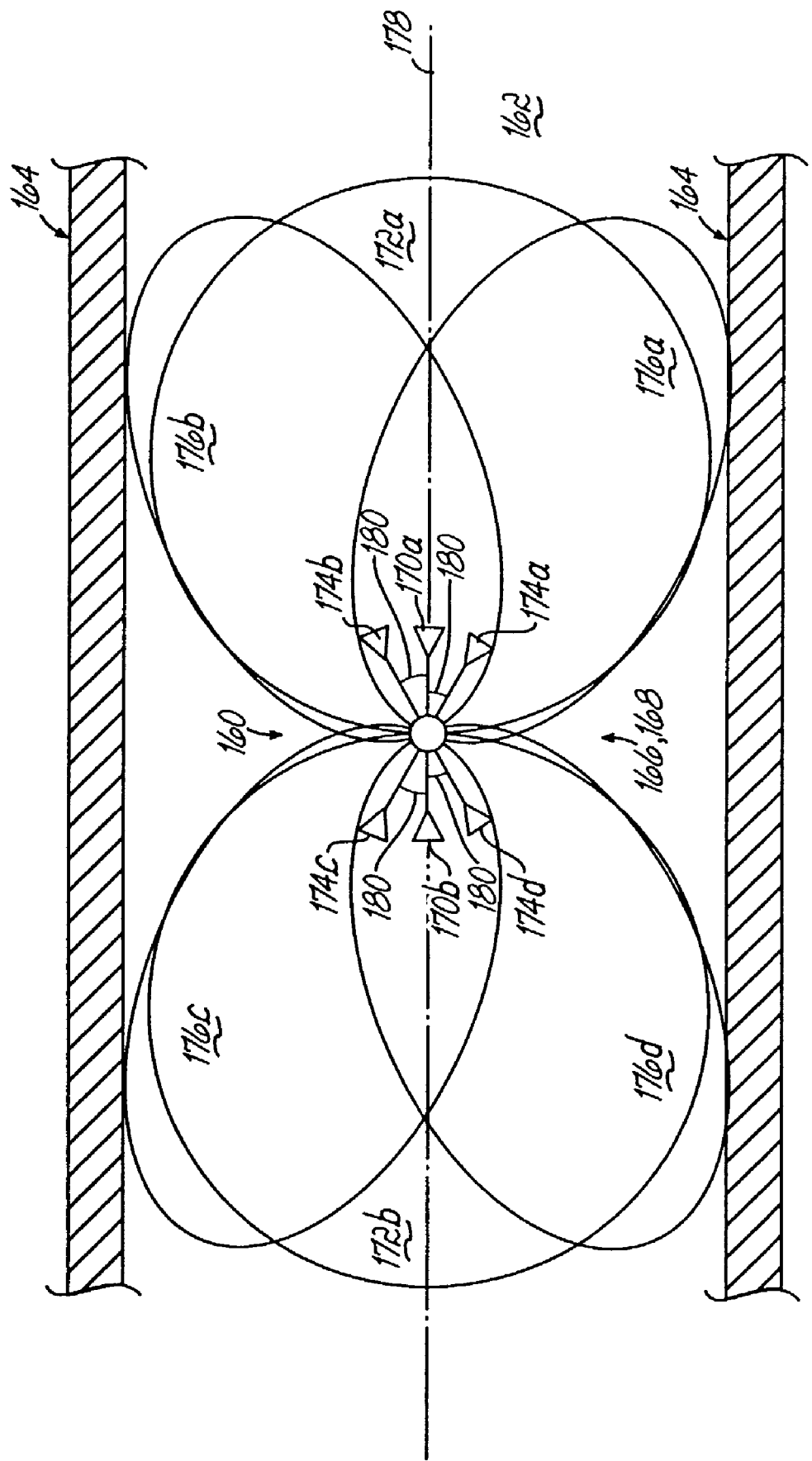
FIG. 8 is a top view of effective ranges of a fifth embodiment of a multi-band wireless access point having a shaped coverage region and configured for operation consistent with principles of the present invention.

Referring to FIG. 8, a top view of the range and/or propagation of a fifth embodiment 160 of a multi-band wireless access point having a shaped coverage region is illustrated. Access point 160 may be advantageously deployed in a hallway or corridor area 162, as bounded by walls 164, and provides a coverage region that is shaped to an bounded region, such as hallway 162.

To this end, multi-band wireless access point 160 comprises a first antenna system 166 including a first plurality of antennas for communicating with subscribers using a first communications protocol and a second antenna system 168 including a second plurality of antennas for communicating with subscribers using a second communications protocol. The second antenna system 168 is generally co-located with the first antenna system 166, as illustrated.

For example, the first antenna system 166 may comprise directional antennas 170a, 170b, where M is the number of antennas and $\alpha$ is the azimuth of each antenna (e.g., M=2, $\alpha$=180°), defining regions 172a, 172b, respectively, while the second antenna system 168 may comprise directional antennas 174a-d where N is the number of antennas and $\beta$ is the azimuth of each antenna (e.g., N=4, $\beta$=90°), defining regions 176a-d, respectively. Antennas 170a and 170b are arranged axially along a centerline 178, along hallway 162 so that the antennas 170a, 170b face opposite ends of hallway 162. Antennas 174a-d are also arranged radically, offset by an angle 180 from centerline 178, along hallway 162 such that antennas 176a and 176b face the opposite end of hallway 162 from antennas 176c and 176d.

As configured, the first standard may be 802.11b and the second standard may be 802.11a. Thus, access point 160 provides two (M=2) low data rate 802.11b channels and four (N=4) high data rate 802.11a channels in the shaped region area within hallway 162. In operation, the directivity of each of the antennas in the plurality of antennas 174a-d is such that the effective range of 802.11a is effectively coextensive with that of 802.11b, as exemplified by regions 176a-d and 172a, 172b, respectively. Those skilled in the art will appreciate that by directing antennas, such as antennas 170a, 170b, 174a-d, in desired directions, such as along or at some angle to the centerline of a hallway, a region of practically any desired shape is obtainable for subscribers.

Using principles of the present invention, existing WLANs or wireless access points may be upgraded to support additional or different communication protocols, often without requiring any changes to the physical layout of wireless access points in a coverage region of a WLAN (e.g., the movement of wireless access points and/or the addition of new wireless access points). Typically, an existing or historical WLAN will include one or more wireless access points each having an antenna system having a first effective range for communicating with subscribers using a first communications protocol. Often, each antenna system utilizes an omni-directional antenna. Upgrading such a WLAN or a wireless access point contained therein comprises installing a second antenna system having a second effective range for communicating with subscribers using a second communications protocol in one or more wireless access points. The second antenna system includes a plurality of antennas and is generally co-located with the first antenna system. The effective ranges for the first and second antennas system are effectively coextensive as described hereinabove.

By virtue of the foregoing, there is thus provided a multi-band wireless access point capable of supporting multiple communications protocols with ranges that are effectively coextensive. Moreover, there is provided a multi-band wireless access point capable of compensating for differences in propagation associated with one or more communications protocols.

While the present invention has been illustrated by the description of the embodiments thereof, and while the embodiments have been described in considerable detail, it is not the intention of the applicants to restrict or in any way limit the scope of the appended claims to such detail. Additional advantages and modifications will readily appear to those skilled in the art. It will be understood that access points consistent with principles of the present invention may be employed in installations of new wireless networks, as well as upgrades of existing networks. Those skilled in the art will also appreciate that the range associated with each communications protocol need not match or be equivalent. In many instances, however, it is desirable for ranges to be effectively coextensive such that the spacing or layout of multi-band wireless access point is not dependent on a particular communication protocol. Further, although known communications protocols have been used for purposes of illustration and explanation, those skilled in the art will appreciate that principles of the present invention may be applied to other, and perhaps unknown, or yet to be developed, communications protocols. Moreover, those skilled in the art will appreciate that antennas and interfaces consistent with principles of the present invention may be configured in the same housing or as separate components. Therefore, the invention in its broader aspects is not limited to the specific details representative apparatus and method, and illustrative examples shown and described. Accordingly, departures may be made from such details without departure from the spirit or scope of applicants' general inventive concept.

What is claimed is:

1. A multi-band wireless access point, comprising:
a first antenna system having a first effective range for communicating with subscribers using a first communications protocol, the first antenna system including at least one antenna; and
a second antenna system generally co-located with the first antenna system, the second antenna system having a second effective range for communicating with subscribers using a second communications protocol, the second antenna system including a plurality of antennas, wherein the plurality of antennas in the second antenna system are configured to compensate for a difference in propagation of the second communications protocol relative to the first communications protocol such that the first and the second effective ranges are effectively coextensive.

2. The multi-band wireless access point of claim 1, wherein the first antenna system comprises an omni-directional antenna.

3. The multi-band wireless access point of claim 1, wherein the first communications protocol is 802.11b and the second communications protocol is 802.11a.

4. The multi-band wireless access point of claim 1, wherein the first communications protocol is 802.11g and the second communications protocol is 802.11a.

5. The multi-band wireless access point of claim 1, wherein the plurality of antennas in the second antenna system are arranged to provide a shaped coverage region.

6. The multi-band wireless access point of claim 1, wherein the first antenna system comprises a plurality of antennas.

7. The multi-band wireless access point of claim 6, wherein the first and the second antenna systems each comprise three directional antennas.

8. The multi-band wireless access point of claim 6, wherein the first antenna system comprises four directional antennas and the second antenna system comprises two directional antennas.

9. The multi-band wireless access point of claim 8, wherein the first communications protocol is 802.11a and the second communications protocol is 802.11b.

10. The multi-band wireless access point of claim 8, wherein the first antenna system comprises eight directional antennas and the second antenna system comprises three directional antennas.

11. The multi-band wireless access point of claim 10, wherein the first communications protocol is 802.11a and the second communications protocol is 802.11b.

12. The multi-band wireless access point of claim 1, further comprising a third antenna system generally co-located with the first and the second antenna systems, the third antenna system having a third effective range for communicating with subscribers using a third communications protocol, the third antenna system including a plurality of antennas, wherein the first, the second, and the third effective ranges are effectively coextensive.

13. The multi-band wireless access point of claim 12, wherein the first antenna system comprises an omni-directional antenna, the second antenna system comprises two directional antennas, and the third antenna system comprises four directional antennas.

14. The multi-band wireless access point of claim 12, wherein the first communications protocol is 802.11g, the second communications protocol is 802.11b, and the third communications protocol is 802.11a.

15. The multi-band access point of claim 1, wherein the first antenna system includes a first circuit, the first circuit coupled to the at least one antenna and configured to interface the at least one antenna with a wired network segment using the first communications protocol; and, the second antenna system includes a plurality of second circuits associated with the second antenna system, the plurality of second circuits coupled to the plurality of antennas and configured to interface the plurality of antennas with the wired network segment using the second communications protocol.

16. The multi-band access point of claim 1, wherein each of the plurality of antennas in the second antenna system has a greater directivity than the at least one antenna in the first antenna system to compensate for a difference in propagation of the second communications protocol relative to the first communications protocol.

17. A multi-band wireless access point, comprising:
a first antenna system for communicating with subscribers using a first communications protocol, the first antenna system including at least one antenna; and
a second antenna system generally co-located with the first antenna system, the second antenna system for communicating with subscribers using a second communications protocol, the second antenna system including a plurality of antennas;
wherein each of the plurality of antennas in the second antenna system has a greater directivity than the at least one antenna in the first antenna system to compensate for a difference in propagation of the second communications protocol relative to the first communications protocol.

18. The multi-band wireless access point of claim 17, wherein the first antenna system comprises an omni-directional antenna.

19. The multi-band wireless access point of claim 17, wherein the first communications protocol is 802.11b and the second communications protocol is 802.11a.

20. The multi-band wireless access point of claim 17, wherein the first communications protocol is 802.11g and the second communications protocol is 802.11a.

21. The multi-band wireless access point of claim 17, wherein the plurality of antennas in the second antenna system are arranged to provide a shaped coverage region.

22. The multi-band wireless access point of claim 17, wherein the first antenna system comprises a plurality of antennas.

23. The multi-band wireless access point of claim 22, wherein the first and the second antenna systems each comprise three directional antennas.

24. The multi-band wireless access point of claim 22, wherein the first antenna system comprises four directional antennas and the second antenna system comprises two directional antennas.

25. The multi-band wireless access point of claim 24, wherein the first communications protocol is 802.11a and the second communications protocol is 802.11b.

26. The multi-band wireless access point of claim 24, wherein the first antenna system comprises eight directional antennas and the second antenna system comprises three directional antennas.

27. The multi-band wireless access point of claim 26, wherein the first communications protocol is 802.11a and the second communications protocol is 802.11b.

28. The multi-band wireless access point of claim 17, further comprising a third antenna system generally co-located with the first and the second antenna systems, the third antenna system having a third effective range for communicating with subscribers using a third communications protocol, the third antenna system including a plurality of antennas, wherein the first, the second, and the third effective ranges are effectively coextensive.

29. The multi-band wireless access point of claim 28, wherein the first antenna system comprises an omni-directional antenna, the second antenna system comprises two directional antennas, and the third antenna system comprises four directional antennas.

30. The multi-band wireless access point of claim 28, wherein the first communications protocol is 802.11g, the second communications protocol is 802.11b, and the third communications protocol is 802.11a.

31. The multi-band access point of claim 17, wherein the first antenna system includes a first circuit, the first circuit coupled to the at least one antenna and configured to interface the at least one antenna with a wired network segment using the first communications protocol; and, the second antenna system includes a plurality of second circuits associated with the second antenna system, the plurality of second circuits coupled to the plurality of antennas and configured to interface the plurality of antennas with the wired network segment using the second communications protocol.

32. An antenna arrangement, comprising:
at least one first antenna configured to operate in a first antenna system having a first effective range for communicating with subscribers using a first communications protocol; and,
a plurality of second antennas generally co-located with the first antenna and configured to operate in a second antenna system having a second effective range for communicating with subscribers using a second communications protocol, wherein the plurality of antennas in the second antenna system are configured to compensate for a difference in propagation of the second communications protocol relative to the first communications protocol such that the first and the second effective ranges are effectively coextensive.

33. The antenna arrangement of claim 32, wherein the first antenna comprises an omni-directional antenna.

34. The antenna arrangement of claim 32, wherein the plurality of second antennas are arranged to provide a shaped coverage region.

35. The antenna arrangement of claim 32, wherein the at least one first antenna comprises a plurality of first antennas.

36. The antenna arrangement of claim 32, further comprising a plurality of third antennas generally co-located with the first and second antennas, the plurality of third antennas configured to operate in a third antenna system having a third effective range for communicating with subscribers using a third communications protocol, wherein the first, the second, and the third effective ranges are effectively coextensive.

37. The antenna arrangement of claim 36, wherein the first antenna comprises an omni-directional antenna, the plurality of second antennas comprises two directional antennas, and the plurality of third antennas comprises four directional antennas.

38. The antenna arrangement of claim 32, wherein each of the plurality of antennas in the second antenna system has a greater directivity than the at least one antenna in the first antenna system to compensate for a difference in propagation of the second communications protocol relative to the first communications protocol.

39. A method of upgrading a wireless network of the type including a wireless access point, the wireless access point of the type including a first antenna system having a first effective range for communicating with subscribers using a first communications protocol, the first antenna system including at least one antenna, the method comprising:
 installing a second antenna system generally co-located with the first antenna system, the second antenna system having a second effective range for communicating with subscribers using a second communications protocol, the second antenna system including a plurality of antennas, wherein the plurality of antennas in the second antenna system are configured to compensate for a difference in propagation of the second communications protocol relative to the first communications protocol such that the first and second effective ranges are effectively coextensive.

40. The method of claim 39, wherein the first antenna system includes a first circuit, the first circuit coupled to the at least one antenna and configured to interface the at least one antenna with a wired network segment using the first communications protocol, the method further comprising:
 installing a plurality of second circuits, the plurality of second circuits coupled to the plurality of second antennas and configured to interface the plurality of second antennas with the wired network segment using the second communications protocol.

41. The method of claim 39, further comprising:
 upgrading a plurality of wireless access points in a coverage area by installing a plurality of second antenna systems, each generally co-located with a respective first antenna system, the second antenna systems each having a second effective range for communicating with subscribers using a second communications protocol, the plurality of second antenna systems each including a plurality of antennas, such that the effective coverage area of the wireless network for the second communications protocol is effectively coextensive with that of the first communications protocol without the addition of additional wireless access points in the coverage area.

42. The method of claim 39, wherein each of the plurality of antennas in the second antenna system has a greater directivity than the at least one antenna in the first antenna system to compensate for a difference in propagation of the second communications protocol relative to the first communications protocol.

43. A method of operation for a multi-band wireless access point, comprising:
 communicating with subscribers using a first communications protocol and a first antenna system having a first effective range; and,
 concurrently communicating with subscribers using a second communications protocol and a second antenna system co-located with the first antenna system and having a second effective range, wherein the second antenna system includes a plurality of antennas configured to compensate for a difference in propagation of the second communications protocol relative to the first communications protocol such that the first and second effective ranges are effectively coextensive.

44. The method of claim 43, wherein the first antenna system includes at least one antenna, and wherein each of the plurality of antennas in the second antenna system has a greater directivity than the at least one antenna in the first antenna system to compensate for a difference in propagation of the second communications protocol relative to the first communications protocol.

* * * * *

UNITED STATES PATENT AND TRADEMARK OFFICE
CERTIFICATE OF CORRECTION

| | |
|---|---|
| PATENT NO. | : 7,623,868 B2 |
| APPLICATION NO. | : 10/244912 |
| DATED | : November 24, 2009 |
| INVENTOR(S) | : Judd et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2198 days.

Signed and Sealed this

Twenty-sixth Day of October, 2010

David J. Kappos
*Director of the United States Patent and Trademark Office*